Figure 1:
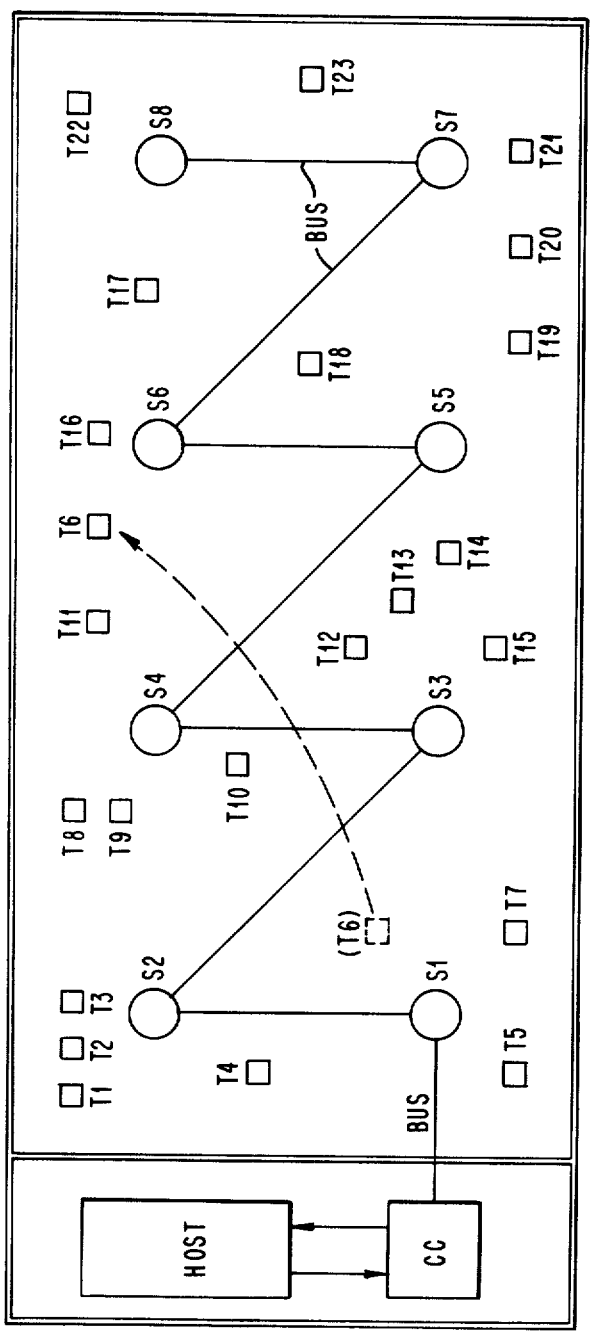

United States Patent [19]

Gfeller et al.

[11] 4,402,090
[45] Aug. 30, 1983

[54] COMMUNICATION SYSTEM IN WHICH DATA ARE TRANSFERRED BETWEEN TERMINAL STATIONS AND SATELLITE STATIONS BY INFRARED SIGNALS

[75] Inventors: Fritz R. Gfeller, Adliswil; Hans R. Mueller, Langnau, both of Switzerland

[73] Assignee: International Business Machines Corp., Armonk, N.Y.

[21] Appl. No.: 321,140

[22] Filed: Nov. 13, 1981

[30] Foreign Application Priority Data

Dec. 23, 1980 [EP] European Pat. Off. ...... 80 108 155.5

[51] Int. Cl.³ ............................................ H04B 9/00
[52] U.S. Cl. ...................................... 455/601; 370/4; 455/607; 455/617
[58] Field of Search ............... 455/617, 601, 600, 606, 455/607; 370/4

[56] References Cited

U.S. PATENT DOCUMENTS 4,229,829 10/1980 Grunwald .......................... 455/600
4,313,227 1/1982 Eder .................................... 455/617

FOREIGN PATENT DOCUMENTS 2823931 12/1979 Fed. Rep. of Germany ...... 455/617

*Primary Examiner*—Howard Britton
*Attorney, Agent, or Firm*—John B. Frisone; Joscelyn G. Cockburn

[57] ABSTRACT

A communication system in which many terminals located in a large room are connected to a host via a plurality of satellites. Data are exchanged between terminals and satellites by infrared signals. All satellites are connected to the host by a common bus arrangement comprising a data line (13) and a synchronization line (15). Each satellite generates a synchronized carrier and modulates it by the downlink data received from the host in a modulator (17). Each terminal may receive overlapping signals from several satellites without disturbance.

Uplink data transmitted from any terminal are stored as packet in a buffer (55) of one or more satellites so that they can be transferred to the host subsequently via the bus arrangement. Each satellite has means (63) for comparing any transferred uplink packet to a packet still stored in its buffer so that any packet is transferred only once to the host and doubly stored packets are eliminated.

6 Claims, 9 Drawing Figures

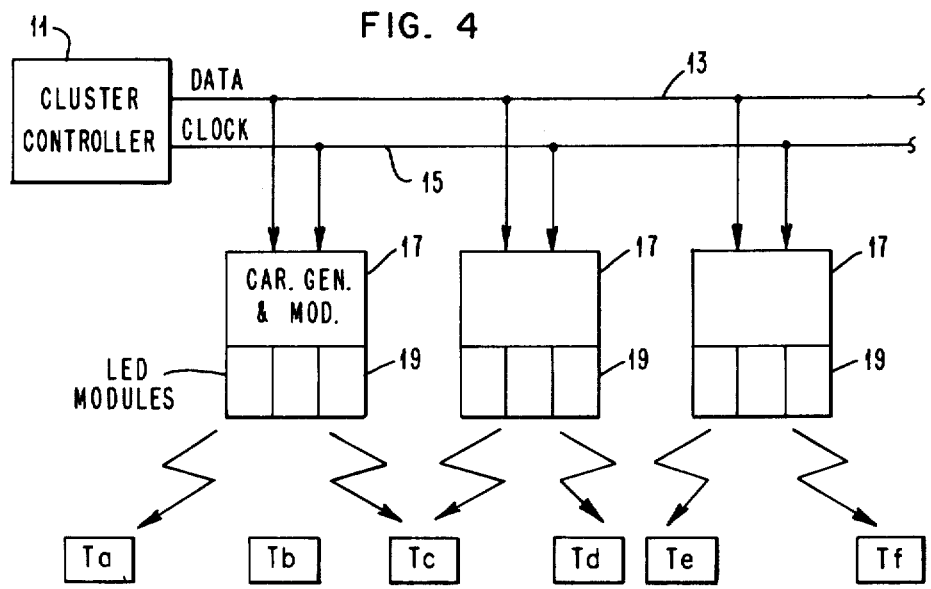

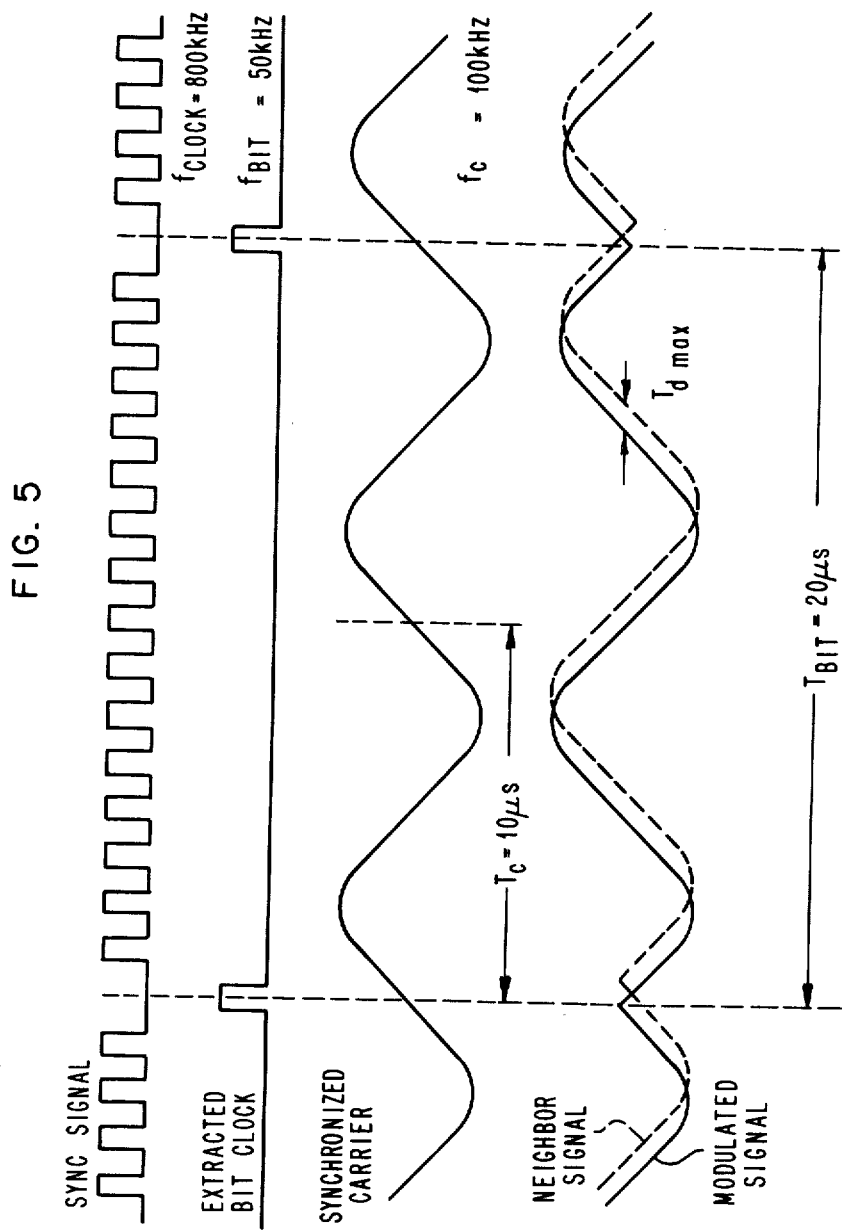

COMMUNICATION SYSTEM IN WHICH DATA ARE TRANSFERRED BETWEEN TERMINAL STATIONS AND SATELLITE STATIONS BY INFRARED SIGNALS

The present invention is concerned with a communication system in which data are transmitted between terminal stations and satellite stations by infrared signals.

A system in which data are distributed from a host computer to several terminal stations via satellite stations using infrared signals is known from the publication "Wireless In-House Data Communication via Diffuse Infrared Radiation," by F. R. Gfeller and U. Bapst, Proceedings of the IEEE, Vol. 67, No. 11 (November 1979), pp. 1474–1486. In this system, a single satellite station is provided in each one of a plurality of rooms. Each satellite can distribute infrared signals to, and receive infrared signals from, a number of terminal stations located within the confines of its room. The satellite stations are connected via electrical lines to a cluster controller which is in turn connected to the host computer. This arrangement is suitable for those situations in which the rooms are of limited size such that the signals radiated by the single satellite in each room can be received correctly by any terminal in the same room, and vice versa. There is a substantial need for data communication in substantially larger areas such as open area offices and large factory halls. It is particularly desirable to use infrared signal links with all their advantages in such situations; however, a single infrared satellite would not be sufficient due to the limited transmission range of infrared transmitters available at reasonable cost. Using multiple satellite transmitters and receivers introduces a problem of radiation overlap and multiple-path reception.

Some radio communicastion systems are known in which multiple transmitters are used. German Published Patent Application No. 2,839,197 describes such a radio transmission system in which a plurality of transmitters with overlapping areas use quasi-synchronous carriers to reduce distortion. This system requires oscillators of extremely high stability which is expensive. For further reduction of distortion, information must be transmitted twice, and the ratio of transmitting power is varied between successive transmissions. These extra steps are both timeconsuming and expensive to implement and are therefore not desirable.

German Published Patent Application No. 2,751,417 disclosed a radio communication system in which a plurality of receivers can simultaneously receive signals from a moving object. To avoid distortion of signals which are simultaneously transferred to a central station from plural receivers means are provided in each receiver to modulate the phase of a clock signal in dependence of the received signal, and to vary the amplitude of the modulated signal in response to the level of the received signal. Thus, the contribution of a receiver receiving a strong signal dominates in the resulting signal furnished to the central station. In the digital data communication systems considered here, it is more desirable not to have a signal-strength dependent process but rather the complete elimination of duplicate copies of data received by two or more different stations.

It is therefore an object of the present invention to provide a communication system using infrared signals, which enables data transfers to terminal stations in an extended area of a size exceeding the transmission range of a single infrared transmitter.

It is a further object to provide an infrared communication system provided with a plurality of satellite stations and a plurality of terminal stations in which each outgoing data message can be received correctly by each terminal despite overlapping radiation fields of the satellites.

A further object is to devise a multiple-satellite infrared communication system in which a message from any terminal is forwarded only once even in those instances where the message was received by several satellite stations.

These objects are achieved by the invention which is defined in the claims.

An embodiment of the invention is disclosed in the following description in connection with the drawings.

Figure 2:
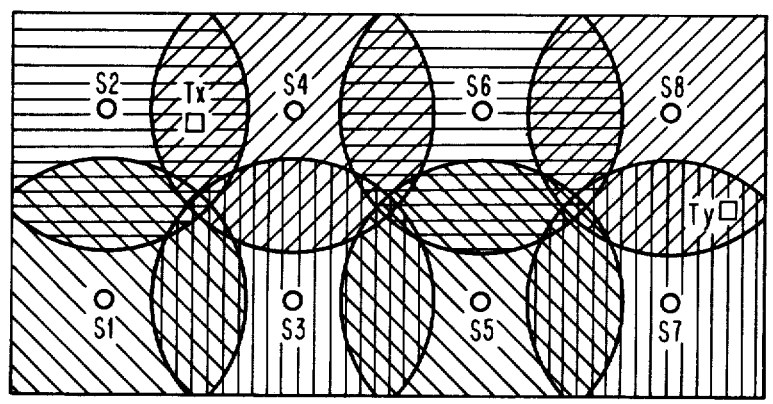
Figure 3:
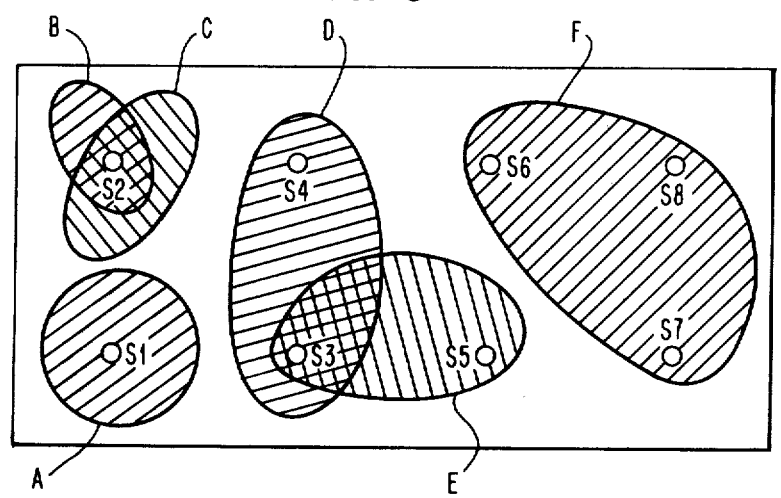
Figure 7:
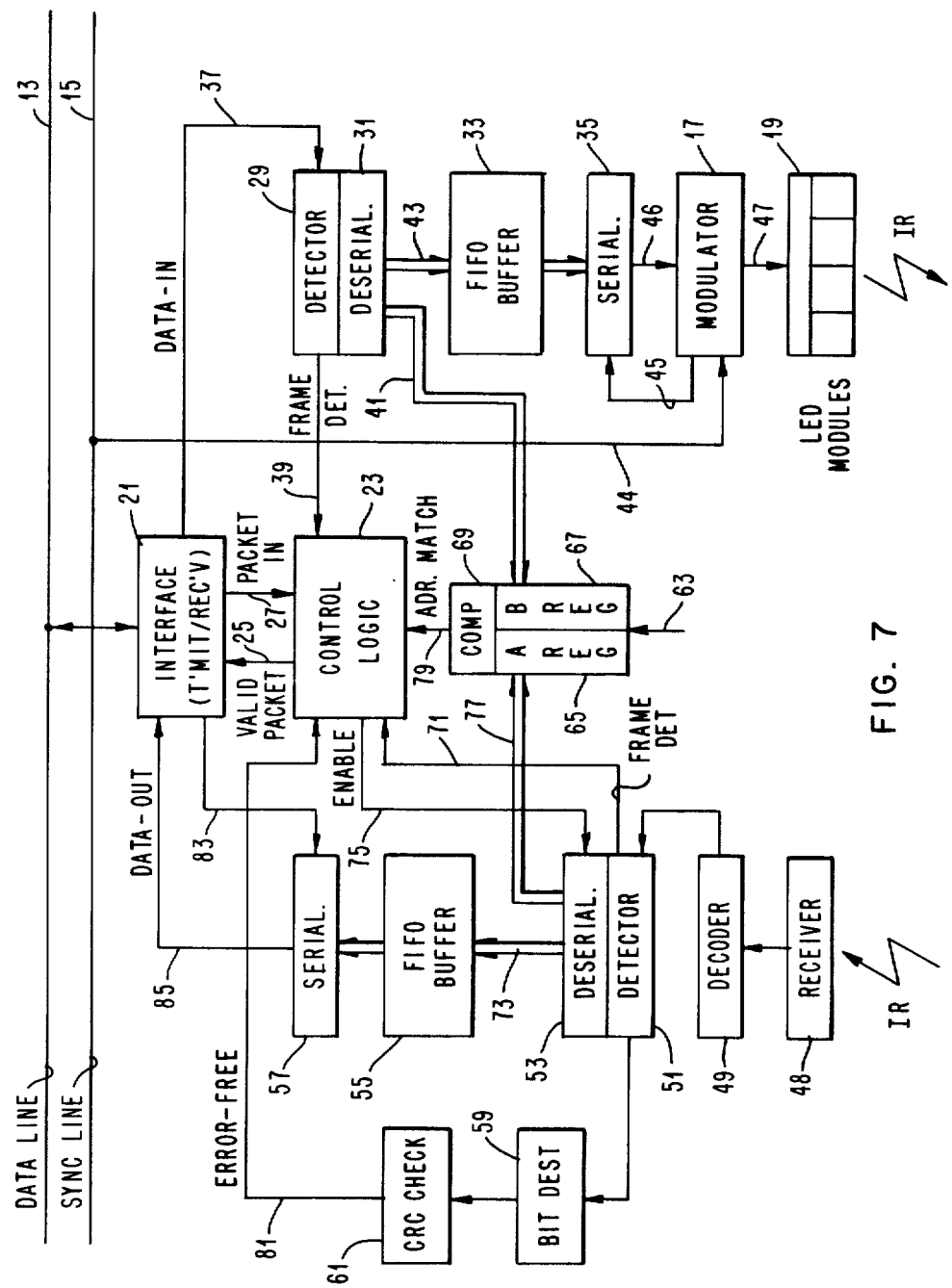
Figure 8:
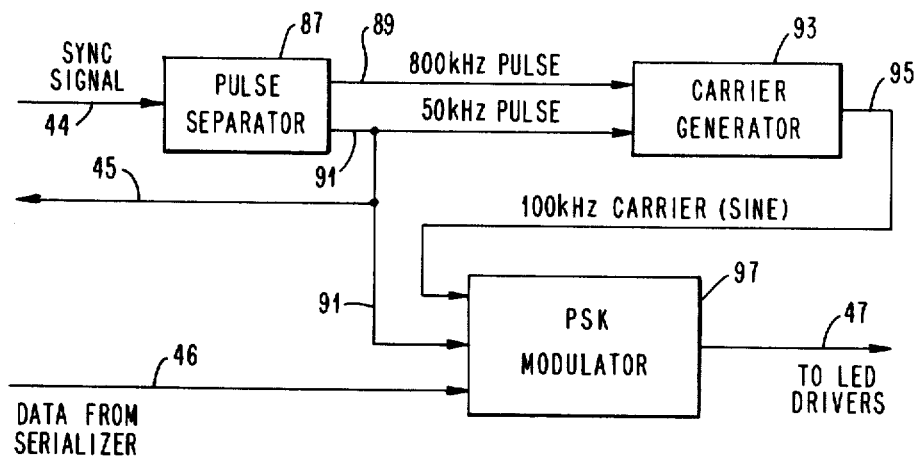
Figure 9:
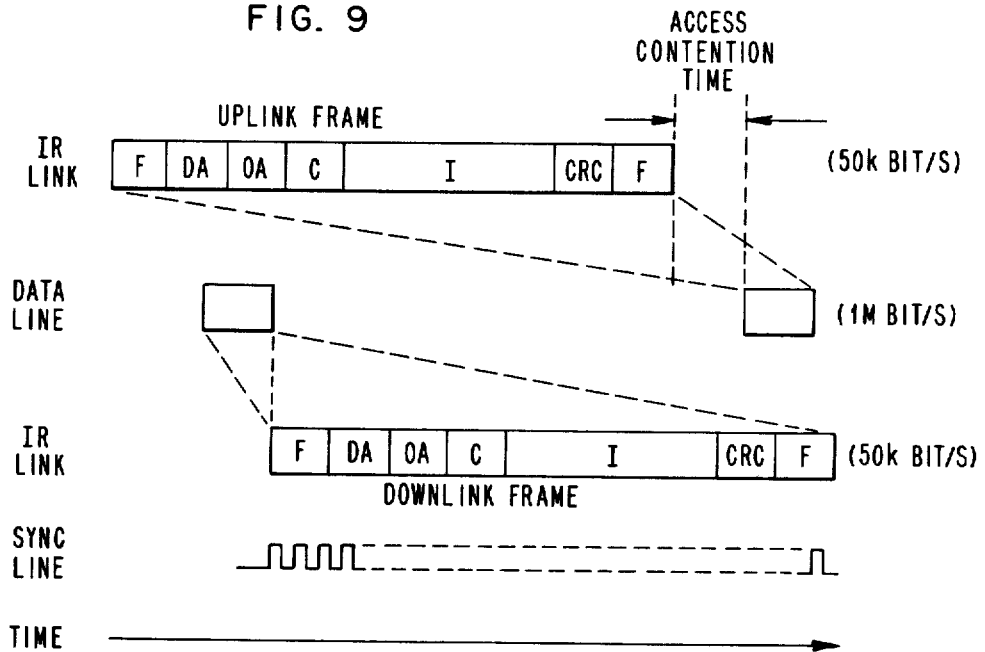

The drawings show:

FIG. 1 an overall view of the communications system showing the spatial relations between satellites and terminals, and the interconnection between the satellites and the host;

FIG. 2 a diagram of the overlapping radiation patterns of all of the satellite stations;

FIG. 3 a diagram of exemplary radiation patterns of terminal stations;

FIG. 4 a block diagram illustrating the principle of simultaneous infrared signal distribution by several satellites;

FIG. 5 a waveform diagram illustrating the time relationships between clock signal, carrier signal and modulated signals;

FIG. 6 a distribution diagram illustrating different situations of data packet reception for the radiation patterns of FIG. 3;

FIG. 7 a block diagram of the functional units in a satellite station, and their interconnections;

FIG. 8 a block diagram of a carrier generator and modulator for the satellite station of FIG. 7; and FIG. 9 a diagram of the time relationship of packet transfers on the electrical bus and the infrared link, for the uplink and downlink directions.

SYSTEM OVERVIEW

FIG. 1 is an overview of a communication system in which the present invention is utilized. The figure shows the floor plan of a large room, e.g., an office hall in a bank, or an industrial shop floor measuring for example 50 m by 100 m. A number of terminal stations T1 through T23 are distributed irregularly about the room. Some of the terminals comprise a display station and input keyboard, others comprise a typewriter-like printer, etc.

All terminals have to communicate with a host computer which may be located in a separate central control room. The transmission facility between the host and the terminals consists of a cluster controller CC and a plurality of satellite stations S1 through S8 interconnected with the central controller by a transmission bus. The cluster controller is directly connected to the host computer. While terminals may be placed on the floor (desk, etc.), the satellites are preferably mounted just below the ceiling like lamps. This arrangement allows an on-line communication between the host and all of the terminals in the single large room. It even permits free movement of any of the terminals within the room to any desired position without the necessity for any system changes. Thus, there will be no interruption of service even during movement.

Transmission from the host to the terminals (DOWNLINK) is as follows: Messages from the host are distributed in the form of electrical signals via the central controller to all satellite stations S1-S8. The satellites radiate infrared signals in which a carrier is modulated by the message data from the host. Satellites act as relay stations, and all messages are broadcasted to all terminals. The range of the infrared signal emitted by a single satellite is limited to approximately 25 m radius. A system of multiple satellites will therefore expand the total area covered considerably.

Transmission from the terminals to the host (UPLINK) is as follows: Any terminal sends its data in a given packet format as infrared signal. The packet is received by one satellite (or possibly several satellites) and stored in a packet buffer. By a suitable method, the cluster controller collects (in the form of electrical signals) the buffered packets from all satellites and transfers them to the host. Uplink and downlink signals have different carrier frequencies so that they do not interfere. The link between the cluster controller and the satellite stations need not be a bus. It could be a closed-loop ring, or the station could be connected in a star configuration by individual lines.

The principles of infrared communication via a satellite station are well known from the above-mentioned paper by Gfeller et al. The conditions and problems, however, of an infrared communication system employing multiple satellites in a common room or area, as suggested by the present invention, will be explained in detail below.

FIG. 2 shows, for the system of FIG. 1, the areas of infrared radiation from each of the eight satellites S1-S8 (DOWNLINK). These areas overlap to some extent to assure that all areas of the office floor are covered, i.e., receiving a DOWNLINK infrared signal from any one of the satellites. This will result, however, in the fact that some of the terminals, such as Tx and Ty, receive signals from two (or more) satellites simultaneously. The invention enables error-free reception of these overlapping signals without problems, as will be explained in the next section in connection with FIG. 4.

The radiation patterns of the terminal stations (UPLINK) may vary considerably, as is illustrated in FIG. 3 for several selected examples. The shaded areas in FIG. 3 indicate regions where the infrared signal originating from individual terminals can be received by a satellite with sufficiently large signal to noise ratio thus guaranteeing a prescribed transmission error rate of say $10^{-8}$. In case A, the signal of one terminal is only received by one satellite (S1). In cases B and C, one and only one satellite (S2) receives simultaneously the signals of two terminals. Cases D and E interfere; in case D, satellites S3 and S4 both receive a signal from the same terminal, and in case E, satellites S3 and S5 receive the signal from another terminal. Thus, satellite S3 receives simultaneously the signals of two different terminals. In case F, three satellites (S6, S7, S8) receive the signal of a single terminal simultaneously. It can be seen that the signals emitted by any one terminal station are always received by at least one satellite. Details of packet collection and transfer to the host in a correct manner despite these irregularities in the distribution of terminal signals will be explained in a later section of this specification in connection with FIGS. 6 and 7.

Packet Format:

The data packets are transmitted in both directions, i.e., DOWNLINK and UPLINK, in the form of standard frames. The frames have the following format (cf. FIG. 9):

(1) Frame delimiter (1 byte)
(2) Destination address (1 byte)
(3) Origin address (1 byte)
(4) Control field (1 byte)
(5) Information field (variable length)
(6) CRC check character (2 bytes)
(7) Frame delimiter (1 byte)

PRINCIPLES OF MULTIPLE-SATELLITE OVERLAPPED SIGNAL DISTRIBUTION TO TERMINALS

FIG. 4 illustrates the present invention's principle of distributing a signal via multiple satellites with overlapping radiation fields. The satellite stations S1, S2, S3—are connected to a cluster controller 11 by a data line 13 and a separate clock line 15. Each satellite has a carrier generator and modulator 17, and a group of infrared LED modules 19 activated by the modulated carrier. The common clock signal on line 15 synchronizes all of the carrier generators. Though the resulting carrier signals will not be absolutely synchronous due to propagation delay of the clock signal on line 15, they are synchronous in a practical sense because any phase difference between carriers of neighboring satellites will be so small that in effect no interference problems will arise. This can be seen from the following computation: Assuming a carrier frequency (intensity variations of the infrared light) of 100 kHz, the time interval for one carrier cycle is 10 $\mu$s. The propagation speed of the cable-bound clock signal is approximately 220,000 km/s. Assuming a maximum clock line length of 100 m between satellites having overlapping radiation fields, the clock signal delay between them will be 0.46 $\mu$s. This, however, is only 4.6% of the carrier cycle time, which poses no problems for the terminal detection circuitry. Investigations have shown that the maximum phase delay between carriers from different satellites should be less than one third (120°) of a carrier cycle, which corresponds to 3.3 $\mu$s. This would allow a maximum cable length between satellites of about 700 m.

The carrier signal in each satellite is modulated by the separately received data signal, e.g., in a PSK modulation process, and the modulated signal is fed within each satellite to the group of LED modules. Each of these modules may radiate in a different direction to achieve a composite desired radiation pattern (e.g., a circular cone, or a specific pattern of lobes).

Respective signal waveforms are shown in FIG. 5. While the transmission "medium" between satellites and terminals is non-coherent infrared light, the "carrier" is an HF signal which will be transmitted as periodic intensity variations of the infrared light. If the carrier is modulated, these periodic intensity variations of the light will change their phase between two discrete values representing the binary data. More details on the modulation process will be provided in a later section dealing with circuitry analyzed in the satellite stations.

As is illustrated in FIG. 4, any terminal station such as Tc may receive a modulated signal from two (or more) satellites. The two (or more) different paths of the infrared signals have most probably different lengths, which is, however, of no real consequence, due to the very short propagation time of the infrared light in the distance ranges considered, i.e., the delays will be in the same magnitude as the clock signal delays on the clock line between neighbor satellites. The total phase difference between the signals from two satellites received by one terminal will never exceed a small fraction of the carrier signal period, and thus will cause no disturbance due to the digital nature of the data signals.

Furthermore, the fact that the infrared signal from one satellite can reach a terminal over several different paths due to diffuse propagation will have no negative effect. An investigation reported in the above-mentioned publication by Gfeller et al has shown that the bandwidth-distance product for a diffuse optical link is approximately 260 MHz×m. Below this limit, no significant phase distortions occur.

As a result, each terminal may receive signals from a plurality of satellites in the new multiple-satellite arrangement without any distortion despite differing cable delays and path lengths.

PRINCIPLES OF MULTIPLE-ACCESS PACKET TRANSFER FROM TERMINALS TO HOST

As was mentioned earlier, UPLINK packet transfer is a two-stage process: From terminal to satellite, and from satellite to host.

Terminal to satellite:

It is assumed for present embodiment that any station when it has a data packet ready can transmit it immediately. Thus, simultaneous transmissions from two or more terminals may occur. As can be seen from the terminal radiation patterns of FIG. 3 and from FIG. 6 which shows for these patterns the packets received by the different satellites, three basic situations may occur:

(a) A packet may collide in a satellite with another packet and be destroyed.

(b) A packet may be correctly received by a single satellite.

(c) A packet may be correctly received in more than one satellite.

For situation (a), a timeout technique or a protocol must be provided (e.g., acknowledgement procedure) which provides for repetition of lost packets. As such methods are well known, they need not be explained here. An alternative for avoiding packet collisions would be to provide ordered multiple access of terminals to the infrared medium, e.g., by a carrier sense multiple access process (CSMA) which is also well known. However, to simplify the description, in the present embodiment packet collisions are allowed and must be resolved by a selected protocol.

Situations (b) and (c) will be discussed in the following section.

Satellite to Host:

For the satellites S1–S8, a carrier sense multiple access (CSMA) procedure is provided to ensure orderly access to the bus. The cluster controller CC is also included in the CSMA procedure. Any satellite which gets access to the bus transmits a packet which will be received by the cluster controller and by all other satellites. The cluster controller will forward the packet to the host as required. Each of the other satellites will buffer the packet and compare it to the current UPLINK packet it may have received from a terminal and stored. If it detects coincidence, it will discard its stored packet because it was doubly received (by two satellites) and has already been transmitted to the host. If the comparison fails to show coincidence, the satellite will continue to compete for the bus and in due course transmit its packet.

Thus, situations (b) and (c) will be handled appropriately: If a packet was received by only one satellite, it will be correctly transferred to the cluster controller and finally forwarded to the host. If a packet was received by several satellites, it will be transferred only once, i.e., by the satellite which first gets access to the bus, and the surplus "copies" in the other satellites will be discarded. Details of this procedure will be explained in a later section.

DOWNLINK packets from the host to the terminals are also distributed over the data bus when the cluster controller gets access to it, but they can be distinguished from UPLINK packets by the origin address (=host's address) so that they can be correctly handled by the satellites (distribution to terminals via infrared link).

In the present embodiment, bus access is regulated by the CSMA procedure as mentioned above. It is, of course, possible to use any other one of many well-known methods, e.g., round-robin polling by cluster controller CC.

DETAILS OF A SATELLITE STATION

FIG. 7 is a block diagram of one of the satellite stations. The bus from cluster controller CC comprises data line 13 and synchronization line 15 for clock signals. An interface unit 21 comprises a transmitter/-receiver section and CSMA logic for regulating access to the data line. Control logic 23 is provided for the other functional units of the satellite. Control lines 25 and 27 between interface 21 and control logic 23 are activated when a valid packet is ready for transmission, or when a packet is received, respectively.

The satellite station's DOWNLINK section shown on the right side of FIG. 7 comprises a frame detector and origin address detector 29 (short: detector), a deserializer and gating unit 31 (short: deserializer), a FIFO buffer 33, a serializer 35, and the carrier generator/modulator 17 (short: modulator) and LED modules 19 also shown in FIG. 4.

Data-in line 37 transfers data from the receiver to the detector 29. Detector 29, upon recognizing a frame delimiter, furnishes a respective control signal on line 39 to control logic 23. Deserializer 31 collects the data transferred to it through detector 29 into words. When an origin address is available in deserializer 31, it is transferred over lines 41 to the transmit section (to be explained later). If the origin address is detected to be the host's address (characterizing a DOWNLINK packet), all data words will be transferred from deserializer 31 over lines 43 into FIFO buffer 33. Data from the buffer can be serialized again by serializer 35, and can be used by modulator 17 which also receives sync signals from synchronization line 15 over line 44, to modulate a carrier as will be explained later. A handshake signal on line 45 from modulator 17 to serializer 35 will cause data to be furnished over line 46 when required. Buffer 33 and serializer 35 cooperate in a well-known manner for extracting data from the buffer whenever the serializer needs them. The modulated carrier is furnished over line 47 to the drivers in LED modules 19 which transmit the DOWNLINK infrared signals.

The satellite station's UPLINK section comprises the following functional units: An infrared signal receiver 48, a decoder 49, a frame detector and origin address detector 51 (short: detector), a deserializer 53, a FIFO buffer 55 and a serializer 57. It further comprises a bit destuffing unit 59, CRC check circuitry 61, and an origin address compare unit 63 including an A register 65, a B register 67, and a comparator 69.

Receiver 48 delivers the modulated carrier which it received as infrared signal, to decoder 49 which furnishes a binary data signal to detector 51. When a frame delimiter is recognized, detector 51 activates a respective signal on line 71 to control logic 23. Deserializer 53 collects the data from detector 51 into words and furnishes these over lines 73 to FIFO buffer 55 if an enabling signal on line 75 from control logic 23 is active. The enabling signal prevents overwriting of the FIFO buffer in case a packet is still waiting in the buffer for transmission to the CC, and a new packet is received via the uplink.

When deserializer 53 contains the origin address of the packet just received, this address is delivered over lines 77 to A register 65 of address compare unit 63. B register 67 is connected to lines 41, for obtaining from deserializer 31 of the DOWNLINK section the origin address of a received packet. If both origin addresses are equal (packet from one terminal received in two satellites), comparator 69 furnishes a match signal on line 79 to control logic 23 which will then prevent transmission of the packet stored in FIFO buffer 55.

Bit destuffing circuit 59 receives all data serially from detector 51, eliminates stuffing bits (which are inserted in an HDLC or SDLC procedure by a terminal during transmission), and furnishes the destuffed data to CRC check circuitry 61 which computes a CRC character from the received data and compares it to the received CRC character at the end of the frame. If the test is positive (no error detected, no packet collision) a respective signal is furnished on line 81 to control logic 23, which thereupon will activate the "valid packet" signal on line 25 for requesting a packet transmission from interface 21. When interface 21 gets access to the data bus, it sends handshaking signals over line 83 to serializer 57 which, in cooperation with FIFO buffer 55, will transfer over a data-out line 85, the whole stored packet to the transmitter in interface 21.

When an address match is indicated on line 79 (same packet already transmitted), the valid packet signal on line 25 is interrupted so that interface 21 interrupts its attempt to access the bus. Thus, a duplicate packet (as well an erroneous packet) will be discarded due to subsequent overwriting of the buffer contents when the next packet from a terminal is received.

CARRIER GENERATOR AND MODULATOR

Some details of the carrier generator and modulator 17 of FIG. 7 (shortly termed "modulator") are shown in the block diagram of FIG. 8. The functional units will be explained in connection with the signal waveforms of FIG. 5.

A pulse separator 87 is connected to synchronizing signal line 44 to receive from the cluster controller the pulse signal shown in the upper row of FIG. 5. It consists of a basic 800 kHz pulse in which a pulse is omitted (violation) at 50 kHz intervals. These intervals correspond to the bit rate on the infrared link. Pulse separator 87 furnishes on its output line 89 a complete 800 kHz pulse signal (no pulses omitted), and on its output line 91 a 50 kHz pulse (one pulse every 20 μs).

Both pulse signals are furnished to inputs of a carrier generator 93. This generator comprises an oscillator circuit which is excited by the 800 kHz pulse and furnishes a 100 kHz sine wave. A carrier frequency of 100 kHz or higher is necessary to provide separation from the higher harmonics of the mains frequency (50 or 60 Hz) emitted by fluorescent lamps which may interfere with the infrared signals at the receivers. This sine wave is synchronized to the 50 kHz pulse as shown in FIG. 5. The synchronized 100 kHz carrier is furnished on output line 95. It is to be noted that in this way, the carrier signals in all terminals are synchronized (except for very small delays due to clock signal propagation delays, as was explained earlier).

A PSK modulator 97 receives on its three inputs the carrier signal (line 95), the 50 kHz pulse (line 91), and the data from serializer 35 (line 46). Whenever a pulse occurs on line 91, i.e., each bit time, it selects the phase of the output signal furnished on line 47 under control of the binary value of the data signal on line 46. For one value, it repeats the carrier unchanged at the output; for the other binary value, it furnishes an inverted carrier, i.e., one that is shifted by 180°, at the output. The modulated signal on line 47 is provided to the drivers of LED modules 19, and controls the intensity of the infrared light emitted. The waveforms at the bottom of FIG. 5 are modulated signals occurring in two satellites. They are identical except for the small delay $T_d$ which is due to the delay of the synchronizing signal on the clock line between the two satellites.

OPERATION OF SATELLITE STATIONS

As was mentioned earlier, data transfer occurs in two directions (DOWNLINK from host/cluster controller to terminals, and UPLINK from terminals to cluster controller/host) via the satellite stations in the form of packets. The frame format was defined in the overview section (see also FIG. 9).

Cluster controller CC and satellite stations S1-S8 contend for access to the data bus in a CSMA procedure, i.e., each of them first listens whether the bus is occupied; if not, it seizes the bus and sends a packet. (Each satellite may have a different unique waiting time before it starts to listen to reduce the collision probability when a packet is received by several satellites). If, however, the bus is occupied, it retries access in accordance with a given algorithm. As many solutions to this problem are known, no description needs to be given here.

For DOWNLINK traffic, the cluster controller furnishes the signals for a packet sequentially to data line 13 of the bus when it gets access to it. The packet will be received by all satellites and will be deserialized and stored into FIFO buffer 33 (FIG. 7). The cluster controller, after transmitting its packet, applies a sequence of clocking signals as shown in FIG. 5 to synchronization line 15 of the bus. All satellites receive this signal sequence, and in response to it transfer the data packet from FIFO buffer 33 through serializer 35 to the modulator where a carrier is generated and modulated by the data signals, with the aid of the clocking signals on line 44, as was described previously in connection with FIG. 8. The modulated carrier is applied to the drivers in LED modules 19 which distribute the data to terminals via the infrared "link."

Speed relations in the embodiment are as follows: As shown in FIG. 5, the carrier frequency for the infrared link is 100 kHz, thus allowing a data speed of 50k Bit/s. The data line 13 and associated circuitry in the satellites are operated at a much higher speed of about 1 M Bit/s. Thus, transfer of data on the bus between cluster controller and satellites is twenty times faster than transfer on the infrared link between satellites and terminal stations.

FIG. 9 illustrates these time relationships: for one packet transfer, the data line is occupied for a short time, whereas the respective signals on the infrared link, and of course the timing signals on the synchronization line, have a much longer duration.

Each DOWNLINK packet is received by each of the terminals, only once (no duplicate or disturbed reception due to multiple paths). Each terminal checks the destination address, and only handles a packet carrying the respective terminal's address or a general broadcast address. Any other packet will be discarded by the terminal.

In UPLINK traffic, any terminal station sends a packet over the infrared link when it is ready to do so. The infrared signal is received by one or more satellite stations and after decoding and deserialization, the received data are stored in FIFO buffer 55 (FIG. 7). The origin address of each UPLINK package received, i.e., the address identifying the sending terminal, is stored in A register 65 to enable elimination of duplicate copies of packets. A CRC error check is made by the respective circuitry (59, 61), and only if a packet was received error-free, a respective "valid packet" signal is furnished to the transmitter/receiver section in the satellite's interface 21. The interface unit will then contend for bus access (CSMA procedure) and when it gets access, transmit the stored data packet (serialized by unit 57) over data line 13.

The packet will be received, as intended, by cluster controller CC for transfer to the host, but it will also be received by all other satellite stations. In these satellites, the received packet will be transferred to and handled by detector 29. As it is recognized by the CC as not being a DOWNLINK packet (destination address: host) the CC will not issue a synchronization sequence to transmit the packet via downlink. The origin address (i.e., the address of the terminal that sent this packet) will be transferred through deserializer 31 to B register 67 in address compare unit 63.

Now the addresses in A register 65 (i.e., the origin address of a packet stored in UPLINK FIFO buffer 55) and in B register 67 (i.e., the origin address of a packet just transmitted from a satellite to the cluster controller and the host) are compared in comparator 69.

If both are equal, a match signal on line 79 indicates that the packet waiting for transmission in the respective satellite, and the packet just transmitted from another satellite have the same originating terminal. Therefore, the waiting packet is a duplicate and should be discarded which is achieved by deactivating the "valid packet" signal on line 25 from control logic 23 to interface 21.

In this manner, only one copy of a packet that was correctly received by several satellites will be transmitted, i.e., the one stored in the satellite which first gets access to the bus. All surplus copies of the packet will be discarded, because of the address match in each satellite that stores a surplus copy.

If no address match occurs in a satellite, a buffered packet in that satellite must be different from the one already transmitted, so that it is kept in the buffer and will be transmitted later.

In this way, all three situations that can occur for UPLINK packets are handled correctly.

(a) Simultaneous reception of two different packets will cause an error signal in the satellite; thus, no erroneous data will be forwarded (packet transmission must be attempted again, however).

(b) A packet received correctly by one satellite only will be correctly forwarded to cluster controller and host.

(c) A packet that was correctly received by and stored in two or more satellites will be correctly forwarded only once. The other copies are discarded.

The timing for UPLINK packet transmission is illustrated in FIG. 9. The transmission from terminals to satellites on the infrared link occurs at a rate of 50k Bit/s (using the 100 kHz carrier). After the complete packet was received and stored, a contention period follows during which satellites try to get access to the bus. When access by one station is acquired, the stored packet at that station is transferred from the UPLINK buffer to the data line, and further to the cluster controller at the high speed rate of 1 M Bit/s.

ALTERNATIVES

Access of terminal stations to infrared link:

In the embodiment, each terminal can send a packet at any time without restriction. This will result in some situations (simultaneous transmission of packets from two terminals which are received by the same satellites) to collision and loss of packets which then must be repeated in accordance with a given protocol.

As an alternative, access to the infrared link could be regulated, e.g., by a CSMA method. Each terminal ready to send would have to listen, before starting transmission, for detecting whether the infrared link is occupied by another sending terminal. If necessary, it will have to wait and try at a later time to access the infrared link in accordance with a given algorithm (many are known). This mechanism would avoid loss and repetition of packets, but would require the provision of additional functions in the terminal stations.

Direction of data transfer:

The disclosed system is designed for data transfer between a host and a plurality of terminals, and vice versa. It is possible to modify the system for providing terminal-to-terminal communication.

In the present embodiment, each UPLINK packet from a terminal is not only transferred to the cluster controller and host, but also to all of the satellite stations. It is used, however, in these satellite stations only for checking the originating terminal's address to avoid duplicate transfer of a packet. Instead of discarding each UPLINK packet in the satellites that was received over the bus (data line), it could be stored in the DOWNLINK buffer for distribution over the infrared link. To synchronize the distribution, the cluster controller would have to generate for each UPLINK packet it received a synchronizing signal sequence (as it does for a DOWNLINK packet originating from the host), and distribute this signal over the clock line to all satellites which then will transmit the stored packet as was described above for DOWNLINK packets from the host.

Bus Arrangement:

The data line and clock line may be combined in a bus arrangement allowing the multiplexed transfer but separate utilization of all data and of clocking information for DOWNLINK carrier synchronization.

While the invention has been particularly shown and described with reference to a preferred embodiment thereof, it will be understood by those skilled in the art that numerous changes in form and detail may be made therein without departing from the spirit and scope of the invention.

Having thus described our invention, what we claim as new, and desired to secure by Letters Patent is:

1. A communication system in which data are transferred between terminal stations and satellite stations by infrared signals, characterized in that for covering an extended area, a plurality of satellite stations (S1-S8) each with infrared transmitting means (17, 19) operating at a common carrier frequency are provided, the radiation fields of said transmitting means at least partially overlapping, and that common electrical link means (13, 15) are provided for transferring to all said satellite stations data signals (13) which are to be distributed to all said terminal stations simultaneously, and for further transferring a common timing signal (15) to all said satellite stations for synchronizing the carrier signals in said transmitting means, and that each terminal station within said extended area is provided with means for selectively accepting only one set of the simultaneously distributed data signals in any time period even if said terminal receives the infrared signals radiated by two or more satellite stations during said time period.

2. A communication system in accordance with claim 1, characterized in that a common control station (CC) is provided for all said satellite stations (S1-S8), and that said common electrical link means (13, 15) is a multidrop bus connecting all said satellite stations to said common control station.

3. A communication system in accordance with claim 1, characterized in that said common electrical link comprises a data bus line (13) and a synchronizing signal bus line (15); that each said satellite station (S2-S8) comprises a buffer (33) for a message received over said data bus, and means (35, 44, 45, 46) connecting said transmitting means (17, 19) to said synchronizing signal bus line and to said buffer so that a message stored in said buffer is transmitted in response to a received synchronizing signal sequence.

4. Communication system in which data are transferred between terminal stations and satellite stations by infrared signals, characterized in that for covering an extended area, a plurality of satellite stations (S1-S8) each with infrared transmitting means (17, 19) operating at a common carrier frequency are provided, the radiation fields of said transmitting means at least partially overlapping, and that common electrical link means (13, 15) are provided for transferring to all said satellite stations data signals (13) which are to be distributed to all said terminal stations simultaneously, and for further transferring a common timing signal (15) to all said satellite stations for synchronizing the carrier signals in said transmitting means, whereby any terminal station within said extended area can correctly receive the distributed data signals even if it receives the infrared signals radiated by two or more satellite stations; and further characterized in that each said satellite station (S1-S8) includes a buffer (55) for uplink message received from any terminal station, that an access and transfer mechanism (21, 57, 83, 85) is provided to separately transfer a buffered message from any satellite station over said common electrical link means (13, 15); and that selecting means (41, 63, 77, 79) are provided for eliminating all identically received copies, except one, of any uplink message.

5. A communication system in accordance with claim 4, characterized in that checking means (59, 61, 81) are provided in each said satellite station for checking error-free reception of any uplink message, and control means (23, 25) for enabling the transfer of a buffered uplink message only if it was received error free.

6. A communication system in accordance with claim 4, characterized in that an uplink message, when transmitted from a satellite station (S1-S8), is distributed over the common bus to said control station (CC) and all said satellite stations, and that said selecting means (63, 79) include comparing means (65, 67, 69) for comparing common parts of a buffered uplink message received from a terminal station, and a distributed uplink message received over the bus, for eliminating uplink messages received in duplicate.

* * * * *